May 29, 1956   HÄNS-JOACHIM M. FÖRSTER ET AL   2,747,430
CHANGE SPEED GEAR WITH HYDRODYNAMIC CLUTCH
Filed May 23, 1951                                   2 Sheets-Sheet 1

Inventors
Hans-Joachim M. Förster
Karl A. Kollmann
Theodor Fr. Kümmich
By Hicke and Padlon
Attorneys Inventors
Hans-Joachim M. Förster
Karl A. Kollmann
Theodor Fr. Kümmich
By Wicke and Padlon
Attorneys

United States Patent Office 2,747,430
Patented May 29, 1956

2,747,430
CHANGE SPEED GEAR WITH HYDRODYNAMIC CLUTCH

Hans-Joachim M. Förster and Karl A. Kollmann, Stuttgart-Bad Cannstatt, and Theodor F. Kümmich, Stuttgart, Germany, assignors to Daimler-Benz Aktiengesellschaft, Stuttgart-Unterturkheim, Germany Application May 23, 1951, Serial No. 227,846

Claims priority, application Germany May 23, 1950

31 Claims. (Cl. 74—732)

The invention relates to a change speed gear with hydrodynamic clutch particularly for motor vehicles.

It is one object of the invention to increase the efficiency of such a speed gear.

It is another object of the invention to effect a simplification of speed gears which are provided with a hydrodynamic clutch and to effect a simplification of their operation.

It is a further object of the invention to make an easy changing of the gear ratios feasible.

An additional object of the invention is to provide a substantially noiseless gear.

A further object of the invention is to provide an arrangement and development of the gear which is as space and weight saving as possible.

Further objects of the invention are concerned with an advantageous locking system for parking and providing a suitable vibration absorbing construction of those gear parts which directly transmit the drive.

Figures 1, 2:
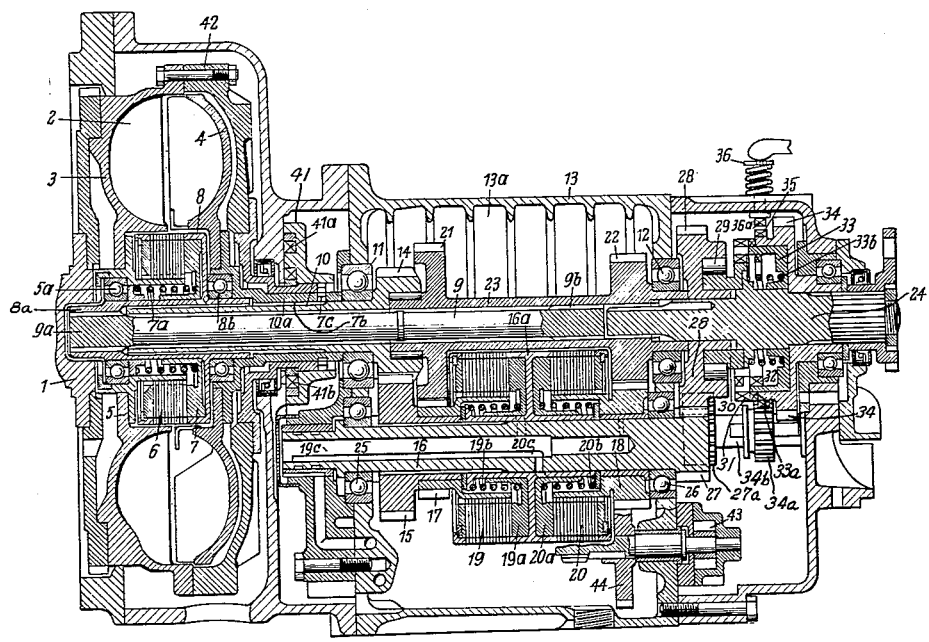
Figure 3:
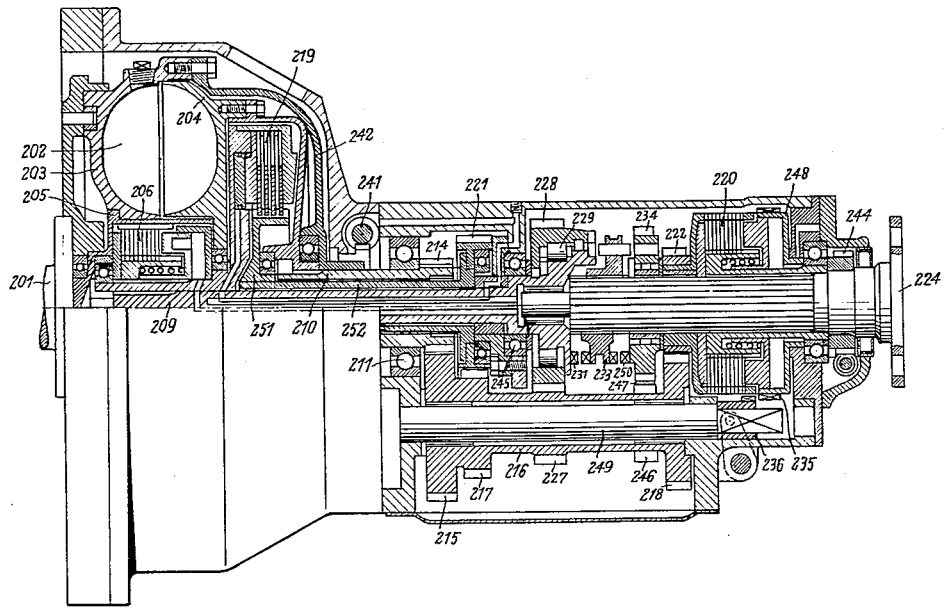
Figure 4:
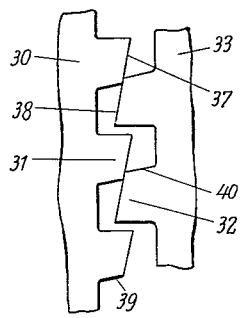

Further objects, characteristics and details of the invention are to be taken from the following description of three examples of construction in accordance with the sectional views shown in Figures 1, 2 and 3. Figure 4 is a fragmentary view of a jaw clutch.

In Figure 1, number 1 is the driving shaft of the engine, e. g. the engine crankshaft, which is connected with a driving half 3 of a hydrodynamic clutch 2, which is firmly connected with the shaft 1, and drives a driven half 4.

The driving half 3 of the hydrodynamic clutch 2 is connected with the coupling piece 5 of a disk clutch 6, which is actuated by a hydraulically controlled piston 7 in such a manner that the coupling is effected by the pressure of the hydraulic fluid, and the uncoupling is effected by the spring 7a. The counter coupling piece 8 of the coupling 6, which serves as a cylinder, is in firm connection with an interior shaft 9, which is for example constructed as a torsion rod with a small diameter, which provides a certain rotary elasticity, and is provided at its junction ends 9a and 9b on a larger diameter with splines or the like. A ball bearing 5a serves for support of the coupling piece 5 on the hub 8a of the counter coupling piece 8, which in turn is supported by a ball bearing 8b in a hub 10a, which is firmly connected with the driven half 4 of the hydrodynamic clutch. The hub 10a is coupled for rotation with a hollow shaft 10. The latter reaches into the chamber 13a of the substantially tripartite change speed gear, which chamber is limited by the two bearings 11 and 12, and carries on its end within the chamber the gear wheel 14 of the constantly meshed gear transmission, which consists of the gear wheels 14 and 15. The gear wheel 15 is firmly arranged on a jackshaft 16. On the latter the gear wheels 17 and 18 are supported in a loosely rotatable manner and the gear wheels can be coupled with the shaft by the disk clutches 19 and 20. The last mentioned clutches are constructed in the same manner as the clutch 6 and have suitably equal diameter measurements with the latter, so that the individual parts of the clutches can be exchanged with each other. Hydraulically operated pistons 19a, 20a engage the respective couplings, when pressure is applied on the right side of the piston 19a or on the left side of the piston 20a, while the release is carried out by springs 19b, 20b. The firmly attached outside clutch plate supporter 16a serves as a cylinder.

The gear wheels 17 and 18 are permanently in gear with the gear wheels 21 and 22 respectively, which are coupled together by the hollow main gear shaft 23, which is firmly coupled for rotation on one hand with the interior shaft 9, and on the other hand with the driven shaft 24.

The jackshaft 16, which is supported in the gear casing 13 by means of the two bearings 25 and 26, is extended beyond the end bearing 26 and carries a gear wheel 27 on its extended end in a self-supporting manner. Said gear wheel 27 meshes with a gear wheel 28, which is supported in a loosely turnable manner on the driven shaft 24. The latter gear wheel contains a freewheel device 29, the interior ring of which comprises a jaw clutch piece 30 with the jaws 31, which can be coupled with the jaws 32 of a counter coupling piece 33. The latter constitutes a hydraulically operated piston, which is coupled for rotation by jaws 33a with its cylinder, which serves simultaneously as a gear wheel 34 for the reverse gear and is slidable in longitudinal direction against the effect of the spring 33b. The reverse gear may be constituted by a pair of gear wheels 27a and 34a, which are arranged on an auxiliary shaft or reverse shaft 34b, the gear 27a is for example in permanent mesh with the gear wheel 27, while the other gear 34a, which may coact with 34, can be coupled with this gear 34 by longitudinal displacement of a gearshift sleeve.

The gear wheel 34 carries also a jaw rim 35, into which a parking latch 36 engages by means of its jaw 36a and thereby locks against turning the gear wheel 34 and the driven shaft 24, which is firmly connected with it.

The freewheel device 29 is constructed in such a manner that when the gear wheel 28 is driven in forward direction it takes along the jaw member 30 and thereby, when jaws 31, 32 are engaged, drives the vehicle through the jaw member 33 and the driven shaft 24. In forward direction of rotation of the jaw member 33 relative to the gear 28, the gear wheel 28 is uncoupled from the driven shaft 24. The jaws 31 and 32 are, as shown in figure 4, suitably beveled both at their faces 37 and 38 and at one flank 39, 40. The first has the purpose to facilitate the engaging of the coupling, as soon as the hydraulic pressure acts on the piston 33 and thereby seeks to engage the jaws 32 into the jaws 31. Through the beveling of the teeth surfaces 39, 40 the release of the coupling is facilitated when the coupling is under load.

For control of the clutches 6, 19, 20 and the coupling 33 provision is made for an oil-pressure system, which is not shown in detail in the drawing, and which directs the liquid to the operating pistons, for example through the hollow shafts, as it is indicated for the operating pistons 19a, 20a by the conduits 19c, 20c. The coupling piston 7 receives oil through a groove 7b in the hollow shaft 10, which is supplied at the front, from a connection boring 7c. In order that the system can be kept under pressure both at standing vehicle, but running engine, and at running vehicle, but standing engine, provision is made on one hand for a primary gear pump 41, which is driven by the cover member 42, and which is connected with the driving half 3 of the hydrodynamic clutch and consists of an annular gear 41a and a spur gear 41b, which runs in the latter, and on the other hand a secondary gear pump 43, which receives its drive from a gear wheel 44, which is for example driven by the gear wheel 18, which gear wheel 44 is permanently coupled with the driven shaft of the transmission and serves for example also for the drive of the tachometer.

The transmission is constructed as a four speed gear. The pair of gear wheels 14, 15, which is in permanent connection with the driven half 4 of the hydrodynamic clutch through the hollow shaft 10 and thereby provides a transmission of the drive in the first three gear ratios through the hydrodynamic clutch, is utilized for the first three gear ratios. The first gear ratio is achieved through the gear wheels 27, 28, the second gear ratio by the gear wheels 17, 21 and the third gear ratio by the gear wheels 18, 22. The constantly meshed gears 14, 15 as well as the gear pairs 27, 27 for the first gear ratio, and 18, 22 for the third gear ratio are hereby arranged directly adjacent to the bearings 11, 12, and the bearings 25, 26, whereby a particularly noiseless transmission, particularly in the third gear ratio, results. The gear wheels 17, 21 for the second gear ratio are arranged directly adjacent to the constantly engaged gears 14 and 15, which assures a noiseless gearing as well. As a result of the outboard arrangement of the gear wheel 27 the distance of the bearings 25 and 26 can be kept relatively short in spite of the interposing of the couplings 19 and 20.

In the position illustrated the gear is in neutral. Through displacement of the piston 33 to the left, the first gear ratio is effective, so that the drive is transmitted to the driven shaft 24 through the hydrodynamic clutch, the constantly meshed gears 14, 15, the jackshaft 16, the pair of gear wheels 27, 28, the freewheel device 29 and the coupling 33.

As soon as one of the two other clutches, for example the clutch 19 for the second gear, is engaged, whereby the drive is transmitted from the jackshaft 16 through the pair of gear wheels 17, 21 to the shafts 23, 24, the first gear is automatically released by overrunning of the freewheel device 29, without necessitating the release of jaws 31, 32. When the clutch 19 is released, the first gear is automatically shifted in again.

For achieving the third gear ratio the clutch 20 is engaged and the clutch 19 released, whereby the drive is effected through the pair of gear wheels 18, 22. In all these gears the drive is effected through the hydrodynamic clutch, as a result of which an easy shifting and smooth starting is assured.

For achievement of a direct drive the clutch 6 is engaged by placing the piston 7 under pressure and the coupling 20 is released. Hereby the engine shaft 1 and the driving half 3 of the hydrodynamic clutch is connected directly with the interior shaft 9 and thereby through the shaft 23 with the driven shaft 24. The hydrodynamic clutch is thereby ineffective since the clutch 6 acts as a bridging coupling. Through this a high efficiency is guaranteed in direct drive.

When the reverse gear is engaged by connecting the two gear wheels 27 and 34 through the reverse gear shaft the jaw connection 31, 32 is disengaged. In all other gears the piston 33 is suitably under pressure, so that the jaws 31, 32 are consequently in gear. Hereby the vehicle is automatically secured against backward rolling on an upgrade, as long as one of the upper gears is engaged, since as a result of the double transmission of the drive through the respective second and third gears as well as through the first gear, which becomes simultaneously effective at backward direction of rotation through the freewheel coupling 29, the drive is locked. This blocking is terminated when no disk clutch has oil pressure. If for parking a rolling of the vehicle is to be prevented, the parking latch 36 can be brought into mesh with the gear rim 35.

In the forms shown in Figures 2 and 3 the parts which correspond in their effect to those in Figure 1 are provided with the same reference numeral except that in each case it is increased by 100 and 200, respectively.

The form of construction in accordance with Figure 2 is mainly distinguished from that in accordance with Figure 1 through the fact that the constantly meshed gears 114 and 115 are arranged at the rear end of the transmission and connect the jackshaft 116 with the driven shaft 124. The hollow shaft 110, which is connected with the driven half 104 of the hydrodynamic clutch is extended to the rear end of the transmission, while the interior shaft 109 is directly coupled with the driven shaft 124.

To achieve the first gear ratio provision is made for a jaw coupling piece 133, through which the gear wheel 128 can be connected, through the freewheel coupling 129 with the jackshaft 116 in one direction of rotation. The drive in the first gear is then effected through the hydrodynamic clutch 102, the hollow shaft 110, the pair of gear wheels 127, 128 and through the constantly meshed gears 114, 115 to the driven shaft 124.

For achieving the second gear ratio the disk clutch 119, is engaged. It provides a drive through the gear wheels 117, 121, the latter of which is arranged on the jackshaft 116 and the first gear 117 is coupled with the main shaft 110 through the disk clutch 119. For achieving the third gear ratio the coupling 120, which couples the gear wheel 122 with the jackshaft, is engaged and the coupling 119 released, whereby the transmission is effected through the pair of gear wheels 118, 122.

In the fourth or direct drive only the coupling 106 is shifted in, which provides a direct drive transmission under bridging of the hydrodynamic clutch from the engine shaft 101 through the interior shaft 109 to the driven shaft 124.

The reverse gear is for example effected through a gear wheel 134, which can be brought in drive connection with a gear wheel, which is arranged on the main shaft, for example the gear wheel 115, through a reverse gear shaft (not shown in the drawing). A parking lock can for example be provided for at the front end of the jackshaft at 135, where for example also the drive of the secondary pump is effected at 143. The primary pump is indicated at 141.

As is to be seen, in this case the gear wheels of the second gear are arranged outside the gear chamber, which is limited by the bearings 111, 112 respectively 125, 126, i. e. the gear wheel 121 is mounted outboard on the jackshaft 116.

The coupling 119 for the second gear is located outside this gear chamber. In contrast with the form of construction in accordance with Figure 1 the gear wheels of the first and of the reverse gear including the freewheel device 129 are arranged within the gear chamber. An additional bearing 145 serves in connection with the bearing 112 for the purpose of supporting the gear wheel 115 of the constantly meshed gears on both sides in the casing 113 and thereby to guarantee quiet running of the gears.

The oil supply to the couplings 106, 119 and 120 is for example again effected through borings or conduits in the shafts. Thus for conducting of the oil to the coupling piston 119a, a conduit 119c is provided in the hollow shaft 110, through the outside annular groove to which the oil is conducted from 119d. The oil is supplied to the coupling piston 120a from pipe 120d through the boring 120c in the jackshaft 116. The conduction to the coupling piston 107 can be effected through the interior shaft 109.

As is to be seen, particularly the shafts 9 and 109 are developed as torsional rods, whereby nonuniformities in the direct drive are received elastically while the hydrodynamic clutch is by-passed. The disk clutches, which are located in shunt with the rotary elastic gear shaft, exercise hereby a damping action on the rotary oscillations of the gear shaft as a result of the friction, which acts in the unengaged friction clutches. In the gears, which act through the hydrodynamic clutch, the vibrations and shocks are received by the hydrodynamic clutch.

The construction in accordance with Figure 2 has, above all, the advantage that as a result of arrangement of the constantly meshed gears at the driven side of the transmission the couplings for the individual gear shifts have to transmit smaller torsional moments. The couplings are arranged in such a manner that at the given transmission ratios they have to transmit the smallest possible moment.

The form of construction shown in Fig. 3 distinguishes mainly from the two forms of construction as described above therein that the pairs of gear wheels for the gear transmissions are located between the shifting couplings, i. e. the latter are arranged at the ends of the gear chamber respectively outside of same. The constantly meshed gears 214, 215 are located, as in the construction in accordance with Figure 1, at the front end of the gear. Directly adjacent the pair of gear wheels 217, 221 follows the second gear pair 217 and 221, the first of which is firmly connected with the gear wheel 215 and the jackshaft 216, which is developed as a hollow shaft. Behind the gears 217 and 221 are gear wheels 227 and 228 (for the first gear ratio) with the freewheel device 229. Then follow the reverse gear wheels 246 and 234, which can be brought into drive connection with each other through a gear wheel 247, which is indicated by a dotted line, and finally the gear wheels 218, 222 for the third gear ratio.

The gear 222 is engaged by the coupling 220, the coupling member 248 of which, which is firmly connected with the driven shaft 224, carries a gear rim 235. In this gear rim the jaw of an axially adjustable sleeve 236 for parking can engage, which is supported in the casing preferably on an axle member 249, which is firmly fixed in the casing and serves for support of the jackshaft 216.

For direct coupling of the engine shaft 201 relative to the driven half 204 of the hydrodynamic clutch 202 a disk clutch 206 is provided, the one coupling member of which is connected to the clutch half 203 of the hydrodynamic coupling and the other coupling member of which is firmly connected with the shaft 209.

The shaft 209 carries on its rear end by means of the freewheel device 229 the already mentioned gear wheel 228 for the first gear and can be directly coupled by means of the jaws 231 through the jaw coupling member 233 with the driven shaft 234. The same coupling member 233 serves for the purpose to couple the gear wheel 234 with the driven shaft 224 by means of the jaws 250.

For effecting the second gear ratio provision is made for a disk clutch 219, which is arranged within a casing-shaped part of the hollow shaft 210, which connects the driven half 204 of the hydrodynamic coupling with the gear wheel 214 of the constantly meshed gears 214, 215. While the one coupling member 251 of the coupling 219 is connected with the gear wheel 221 by means of a hollow shaft 252, the other coupling half 253 of the coupling 219 is arranged on the interior shaft 209. The gear wheels 214 of the constantly meshed gear pair 214, 215 and 221 for the first gear ratio are supported between bearings 211 and 245.

In the first through third gear ratios as well as in the reverse gear the drive transmission is carried out through the hydrodynamic clutch 202, the driven part 204 of which drives through the hollow shaft 210 in constant connection with the pair of gear wheels 214, 215 and therethrough with the jackshaft 216. The gear wheels 228 for the first gear, 221 for the second gear and 222 for the third gear rotate together. For effecting the first gear ratio the coupling 233 is coupled with the jaws 231. When a higher gear is engaged, the gear wheel 228 is thereby overrun and the first gear ratio becomes ineffective. If for effecting the second gear ratio the coupling 219 is engaged, the latter connects the gear wheel 221 with the interior shaft 209, so that the drive is transmitted from the hydrodynamic clutch through the gear wheels 214, 215, 217, 221 and through clutch 219 to the interior shaft 209. In order to make a connection from shaft 209 to the driven shaft 224 feasible, the coupling 233 must therefore also be engaged to effect the second gear ratio.

For shifting to the third gear ratio the clutch 220 is engaged. The drive is in this case effected from the hydrodynamic clutch through the gear wheels 214, 215, 218, 222 directly to the driven shaft 224. The third gear does therefore not require the coupling 233, so that on occasion the latter can also be released in the third gear.

In the direct drive the driving half 203 of the hydrodynamic clutch is again directly connected with the interior shaft 209 by the clutch 206, whereby the connection to the driven shaft 224 is again effected by the jaw clutch 233.

The drive of the primary pump is again effected by a casing-shaped part 242, which is connected with the driving half 203 of the hydrodynamic clutch, for example by means of a spiral gearing 241, while the secondary oil pump is for example driven by a gear wheel 244 of the driven shaft 224.

In the three examples of construction illustrated the shifting clutch 6, 106 or 206 is arranged for providing a direct gear within the interior circumference of the hydrodynamic clutch, so that the shifting coupling does not increase the over-all length of the transmission.

In order to facilitate an understanding of the operation of the forms of construction shown as illustrative of the invention, reference may be had to the following tabulations showing the setting of the several clutches and couplings to effect the different drive ratios:

*Form of Figure 1*

|  | Clutch 6 | Clutch 19 | Clutch 20 | Coupling 31, 32 | Power transmitted through gears— |
|---|---|---|---|---|---|
| Neutral | Disengaged | Disengaged | Disengaged | Disengaged | None. |
| 1st gear | ___do___ | ___do___ | ___do___ | Engaged | 14, 15, 27, 28. |
| 2nd gear | ___do___ | Engaged | ___do___ | Optional | 14, 15, 17, 21. |
| 3rd gear | ___do___ | Disengaged | Engaged | ___do___ | 14, 15, 18, 22. |
| Direct | Engaged | ___do___ | Disengaged | Optional | None. |

*Form of Figure 2*

|  | Clutch 106 | Clutch 119 | Clutch 120 | Coupling 133 | Power transmitted through gears— |
|---|---|---|---|---|---|
| Neutral | Disengaged | Disengaged | Disengaged | Disengaged | None. |
| 1st gear | ___do___ | ___do___ | ___do___ | Engaged | 127, 128, 114, 115. |
| 2nd gear | ___do___ | Engaged | ___do___ | Optional | 117, 121, 114, 115. |
| 3rd gear | ___do___ | Disengaged | Engaged | ___do___ | 118, 122, 114, 115. |
| Direct | Engaged | ___do___ | Disengaged | Disengaged | None. |

Form of Figure 3

|  | Clutch 206 | Clutch 219 | Clutch 220 | Coupling 233 | Power transmitted through gears— |
|---|---|---|---|---|---|
| Neutral | Disengaged | Disengaged | Disengaged | Disengaged | None. |
| 1st gear | do | do | do | Engages 231 | 214, 215, 227, 228. |
| 2nd gear | do | Engaged | do | do | 214, 215, 217, 221. |
| 3rd gear | do | Disengaged | Engaged | Optional | 214, 215, 218, 222. |
| Direct | Engaged | do | Disengaged | Engaged | None. |

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

We claim:

1. Change speed gear comprising a driving member, a hydrodynamic clutch with a driving clutch part which is connected with the driving member, and a driven clutch part, an interior shaft, a second clutch for coupling the driving clutch part of the hydrodynamic clutch with the interior shaft, a hollow shaft surrounding said interior shaft connected with the driven part of the hydrodynamic clutch, a driven gear member, transmission members between the hollow shaft and the driven gear member, a third clutch for the said transmission members and means for directly coupling the interior shaft with the driven gear member.

2. Change speed gear comprising a driving member, a hydrodynamic clutch with a driving clutch part which is connected with the driving member, and a driven clutch part, an interior shaft, a second clutch for coupling the driving clutch part of the hydrodynamic clutch with the interior shaft, a hollow shaft surrounding said interior shaft connected with the driven part of the hydrodynamic clutch, a driven gear member, means for directly connecting the driven part of the first clutch with this gear member, a jackshaft, a pair of gear wheels for connecting the hollow shaft with the jackshaft and with the driven gear member and at least one additional clutch arranged on the jackshaft for coupling one of the gear wheels with the jackshaft.

3. Change speed gear in accordance with claim 1, wherein the clutch for connecting the driving clutch part of the hydrodynamic clutch with the interior shaft is arranged radially within the vane ring of the hydrodynamic clutch.

4. Change speed gear comprising a driving member, a hydrodynamic clutch with a driving clutch part which is connected with the driving member, and a driven clutch part, a first interior shaft, a second shaft which encloses the interior shaft concentrically, and a third shaft which encloses the second shaft concentrically, a second clutch for coupling the first shaft with the driving clutch part of the hydrodynamic clutch, means for connecting the third shaft with the driven clutch part of the hydrodynamic clutch, a gear wheel on the second shaft, a gear wheel on the third shaft, a jackshaft, one gear wheel each on the jackshaft in mesh with one each of the aforementioned gear wheels, a driven gear shaft, at least one pair of gear wheels connecting the jackshaft with the driven gear shaft, and a third clutch for direct coupling of the first interior shaft with the driven gear shaft.

5. Change speed gear in accordance with claim 4 wherein the second shaft is connected through the first mentioned gear wheels with the third shaft, in combination with a fourth clutch for coupling the second shaft with the first shaft so that a drive from the driven part of the hydrodynamic clutch is made possible through the third and second shaft to the first shaft.

6. Change speed gear comprising a gear casing, a driving member, a hydrodynamic clutch with a driving clutch part which is connected with the driving member, and a driven clutch part, an interior shaft which is rotatable with the one clutch part, a shaft which coaxially surrounds the first shaft and is rotatable with the other clutch part, a main gear shaft coaxial with the aforementioned shafts with means for direct coupling with the interior shaft, a jackshaft, at least three pairs of gear wheels for connecting the jackshaft with the surrounding shaft and the main gear shaft, at least two disk clutches for coupling of two pairs of gear wheels with one of the pertinent shafts, two bearings for support of the jackshaft in the casing, one bearing each for support of the surrounding shaft and of the main gear shaft in the casing, whereby the gear wheels are arranged close to the bearings and the clutches are arranged between the gear wheels, and a further clutch for coupling the interior shaft with that part of the hydrodynamic clutch which is rotatable with it in immediate vicinity of the said hydrodynamic clutch.

7. Change speed gear comprising a gear casing, a driving member, a hydrodynamic clutch with a driving clutch part which is connected with the driving member, and a driven clutch part, an interior shaft which is rotatable with the one clutch part, a shaft which is concentric with the first shaft and is rotatable with the other clutch part, a main gear shaft coaxial with the aforementioned shafts with means for direct coupling with the interior shaft, a jackshaft, at least three pairs of gear wheels for connection of the jackshaft with the surrounding shaft and the main gear shaft, at least two disk clutches for coupling of two pairs of gear wheels with one of the pertinent shafts, two bearings for support of the jackshaft in the casing, one bearing each for support of the surrounding shaft and of the main gear shaft in the casing, whereby two of the pairs of gear wheels are arranged on both sides of the one pair of bearings on the pertinent shafts and the other pair of gear wheels is arranged at the other bearings of the pertinent shafts, the one disk clutch between the bearings and the gear wheels which are arranged between these, and the other disk clutches outside the bearings and adjacent to the gear wheels, which are arranged outside the gear wheels, and a further clutch for coupling the interior shaft with that part of the hydrodynamic clutch which may rotate with it, in immediate vicinity of said hydrodynamic clutch.

8. Change speed gear in accordance with claim 6 wherein all disk clutches have equal measurements so that they are exchangeable with each other.

9. Change speed gear comprising a casing, a gear shaft, a non-rotatable gear shaft supporting rod parallel to said first mentioned shaft, a gear member rotating with the first gear shaft, a shift sleeve arranged slidably and non-rotatably on the parallel gear shaft supporting rod, and means on the shift sleeve as well as on the rotating gear member adapted to couple the two parts with each other and to thereby lock the first mentioned shaft relative to the casing.

10. A speed change transmission comprising a driving member, a driven shaft, means including a disengageable friction clutch adapted to establish a direct power-transmitting connection between said driving member and said driven shaft, a second shaft, a plurality of gearings of different ratios of transmission mounted on said shafts, each of said gearings being adapted to be optionally rendered ineffective or effective to establish a power-transmitting connection between said second shaft and said driven shaft, and means including a hydrodynamic clutch adapted to establish a driving connection between said driving member and said second shaft.

11. A speed change transmission comprising a driving member, a driven shaft, means including a disengageable friction clutch adapted to establish a first power-transmitting connection between said driving member and said driven shaft, a second shaft, a plurality of pairs of meshing gears mounted on said second shaft and on said driven shaft, said pairs having different ratios of transmission, one gear of each pair being fixed to its shaft, a disengageable clutch coordinated to the other gear of each pair and its associated shaft and adapted when engaged to establish a second power-transmitting connection between said second shaft and said driven shaft, and means including a hydrodynamic clutch adapted to extend said second power-transmitting connection from said second shaft to said driving member.

12. Speed change transmission as claimed in claim 11 in which said first power-transmitting connection is a direct connection of a 1:1 ratio, whereas said second power-transmitting connection is a speed-reducing connection causing said driven shaft to run at a lower rate of speed than said driving member.

13. In a speed change transmission for motor vehicles, the combination comprising a driving member, a driven shaft adapted to be geared to the wheels of the vehicle, a second shaft, a plurality of pairs of reducing gears of various ratios of transmission mounted on said shafts and adapted to establish a driving connection therebetween, said pairs including one low speed pair having the highest ratio of transmission of said pairs, a hydrodynamic clutch composed of two sections, one of said clutch sections being connected to said driving member and the other one of said sections being geared to said second shaft, a free-wheeling clutch being included in the train of motion-transmitting elements constituted by said second shaft, by said low speed pair and by said driven shaft, said free-wheeling clutch being mounted to enable said driven shaft to overtake the associated gear of said low speed pair when driven by one of the other pairs of gears, and a clutch adapted to establish a direct driving connection between said driving member and said driven shaft.

14. Speed change transmission as claimed in claim 10 in which one of said plurality of gearings is connected to one of said shafts by a free-wheeling clutch.

15. A speed change transmission comprising the combination set forth in claim 10 combined with a detent member mounted in the casing of the transmission and adapted to cooperate with said driven shaft for the purpose of blocking same, and with means for disabling and enabling said member to cooperate with said driven shaft.

16. In a speed change transmission, the combination comprising a shaft, a first gear, a second gear and a rotary member mounted on said shaft for relative rotation, free-wheeling clutch means permanently interposed between said first gear and said rotary member, and disengageable tooth-clutch means for positively clutching said rotary member and said second gear.

17. In a speed change transmission, the combination claimed in claim 16 in which the teeth of said tooth-clutch means have end faces positioned at an acute angle to a plane extending at right angles to said shaft, one side face of each tooth extending at an acute angle to the axis of said shaft.

18. A speed change transmission for a motor vehicle comprising a driven shaft adapted to be geared to the wheels of the vehicle, three gears mounted coaxially thereto, means for connecting said three gears to said driven shaft, a secondary shaft, three gears mounted on said secondary shaft and meshing with said first mentioned gears, multi-disk friction clutches for connecting and disconnecting at least two of said last mentioned gears to and from said secondary shaft, a gear casing having partitions, anti-friction bearings in said partitions supporting said shafts, said gears being located between said anti-friction bearings and said multi-disk friction clutches, a member adapted to be connected to the engine of the vehicle, a train of motion-transmitting elements connecting said member to said secondary shaft and including a hydrodynamic clutch, and a disengageable clutch adapted to connect said driving member to said driven shaft for common rotation.

19. In a speed change transmission, the combination set forth in claim 13 in which a bearing is provided for said second shaft, one end of the latter projecting therefrom, said low speed pair including a gear mounted on said end of said second shaft.

20. In a speed change transmission for motor vehicles, the combination comprising a driving member adapted to be connected to an engine, a driven shaft adapted to be geared to the wheels of the vehicle, a hydrodynamic clutch composed of a driving section connected to said driving member, and of a driven section, both sections constituting an annular chamber adapted to contain a liquid, a reduction gearing, means adapted to render said reduction gearing ineffective or effective to connect said driven section of the hydrodynamic clutch to said driven shaft, a clutch adapted to establish a direct power-transmitting connection between said driving member and said driven shaft, fluid-controlled means to disable said reduction gearing, and fluid-controlled means to engage said last mentioned clutch when said reduction gearing is ineffective.

21. In a speed change transmission for motor vehicles, the combination comprising a hydrodynamic clutch composed of a driving section adapted to be connected to the engine of said vehicle and of a driven section, both sections constituting an annular chamber adapted to contain a liquid and having vanes in said chamber, a hollow shaft connected to said driven section of said hydrodynamic clutch, a driven shaft adapted to be geared to the wheels of the vehicle, said shafts and said sections being mounted in coaxial relationship, a reduction gearing, means rendering said reduction gearing ineffective or effective to connect said hollow shaft with said driven shaft, and a train of motion-transmitting elements connecting said driving section and said driven shaft and including a disengageable clutch and an inner shaft mounted within said hollow shaft.

22. A speed change transmission as claimed in claim 10 in which said driving member, said driven shaft, said friction clutch, and said hydrodynamic clutch are mounted in coaxial relationship.

23. A speed change transmission as claimed in claim 21 in which said friction clutch is mounted within said hydrodynamic clutch and in coaxial relationship thereto and to said driven shaft.

24. Change speed gear in accordance with claim 10 comprising a transmission shaft formed by a torsionally elastic rod which is included in said direct power-transmitting connection.

25. Change speed gear in accordance with claim 1 wherein the interior shaft is a torsionally elastic shaft of small diameter.

26. Change speed gear in accordance with claim 1 wherein the interior shaft is a torsionally elastic shaft of small diameter and the second clutch and the third clutch are hydraulically operated disk clutches.

27. Change speed gear in accordance with claim 10 comprising furthermore a transmission shaft which is a torsionally elastic rod included in said direct power-transmitting connection which bypasses the hydrodynamic clutch, and friction clutches for rendering said gearings effective or ineffective.

28. Change speed gear in accordance with claim 10 comprising a transmission shaft formed by a torsionally elastic rod in said direct power-transmitting connection which bypasses the hydrodynamic clutch, said rod having a small diameter over most of its length and having enlarged splined ends for coupling said transmission shaft with said driving member on one hand and with said driven shaft on the other hand.

29. Change speed gear in accordance with claim 16 wherein the second gear wheel is formed to provide a cylinder and said disengageable tooth-clutch means include a piston for actuation.

30. Change speed gear in accordance with claim 16 comprising also a casing, means for splining said second gear to said shaft, and means for locking the second gear and thereby also the shaft relative to the casing.

31. Change speed gear comprising a casing, a driving gear shaft, a driven transmission shaft, a jackshaft, two bearings for support of the jackshaft in the casing, one bearing for each of the two first-mentioned shafts, at least one pair of gears for connecting the jackshaft with the driving shaft and at least two pairs of gears for connecting the jackshaft with the driven transmission shaft, the jackshaft being extended beyond one of its bearings, a first gear wheel on the jackshaft extension, a second gear wheel and an annular clutch piece both rotatably mounted on the driven shaft, said second gear meshing with said first gear wheel, a freewheeling device between said second gear wheel and said clutch piece, a third gear wheel arranged on the driven shaft, and means for coupling said third gear wheel with said clutch piece.

References Cited in the file of this patent

UNITED STATES PATENTS

| | | |
|---|---|---|
| Re. 22,967 | Nutt et al. | Jan. 27, 1948 |
| 2,226,802 | Black | Dec. 31, 1940 |
| 2,277,214 | Dodge | Mar. 24, 1942 |
| 2,449,608 | Le May | Sept. 21, 1948 |
| 2,449,964 | Banker | Sept. 21, 1948 |
| 2,453,794 | Iavelli | Nov. 16, 1948 |
| 2,507,999 | Schjolin | May 16, 1950 |
| 2,534,134 | Kirkpatrick | Dec. 12, 1950 |
| 2,567,446 | Polomski | Sept. 11, 1951 |
| 2,591,342 | Dodge | Apr. 1, 1952 |
| 2,620,684 | McFarland | Dec. 9, 1952 |
| 2,627,189 | McFarland | Feb. 3, 1953 |

FOREIGN PATENTS

| | | |
|---|---|---|
| 938,552 | France | Apr. 5, 1948 |

OTHER REFERENCES

Packard Serviceman's Training Book on Ultramatic Drive (rec'd June 27, 1949).